UNITED STATES PATENT OFFICE.

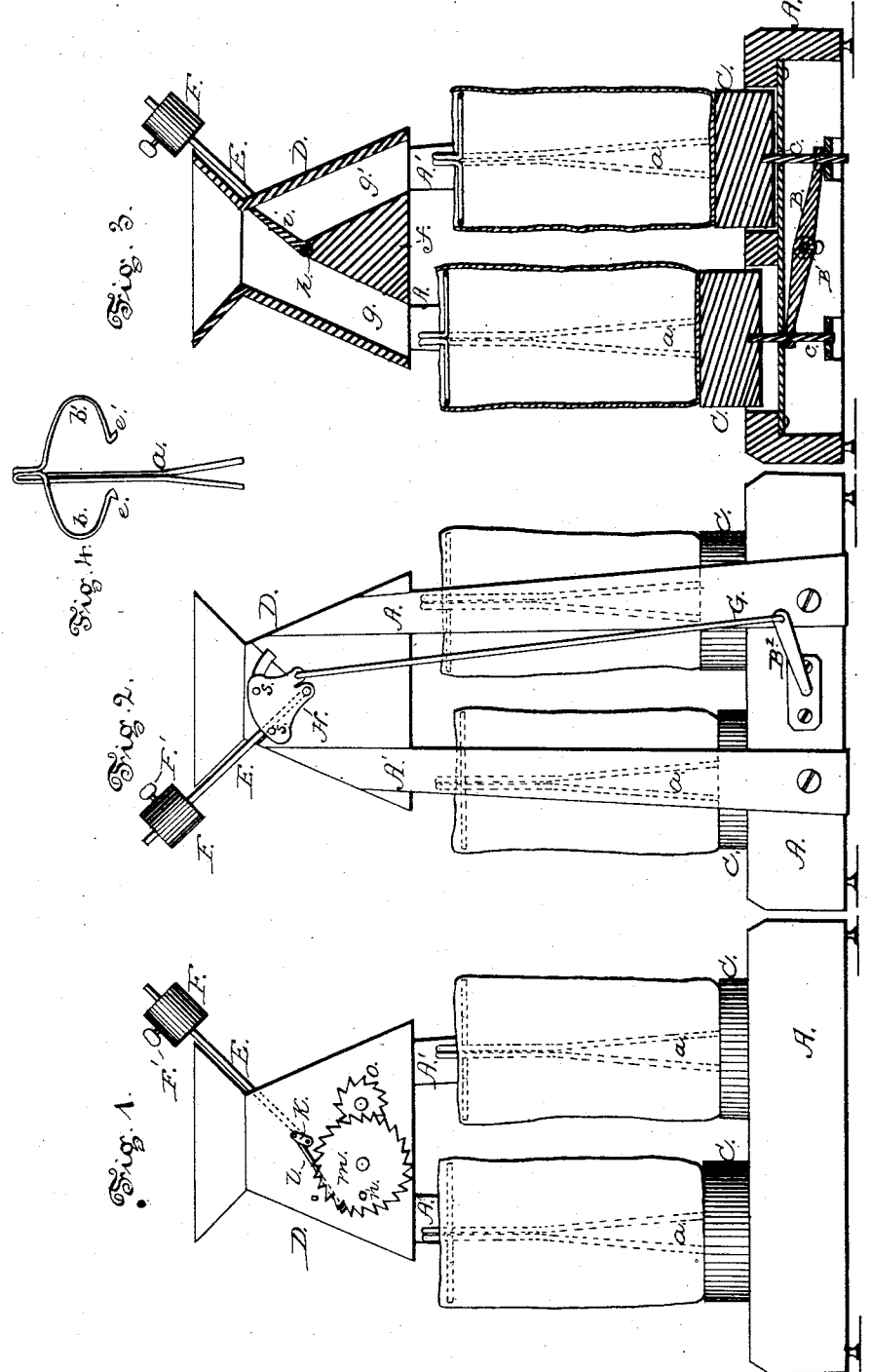

CHARLES J. LEACH AND ALLEN OLDS, OF HARTFORD, MICHIGAN.

COMBINED GRAIN SCALE, BAGGER, AND REGISTER.

SPECIFICATION forming part of Letters Patent No. 287,692, dated October 30, 1883.

Application filed February 27, 1883. (No model.)

*To all whom it may concern:*

Be it known that we, CHARLES J. LEACH and ALLEN OLDS, citizens of the United States, residing at Hartford, in the county of Van Buren and State of Michigan, have invented certain new and useful Improvements in Combined Grain Scale, Bagger, and Register; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention has for its object to provide a novel and simplified apparatus for automatically weighing, bagging, and registering grain; and it consists, essentially, of a base or platform containing the scale, mechanism provided with the bag-holding devices, and which is surmounted with a suitable hopper connected to the said base or platform by a vertical frame or support, a rod connecting the scale mechanism in the base or platform with a cam upon the rear side of the said hopper, to move an adjustable weight in reverse directions during the operation of the apparatus, all as will be hereinafter more fully described, and specifically designated in the claims.

In the accompanying drawings, Figure 1 represents a front elevation of our improved apparatus; Fig. 2, a rear elevation of the same; Fig. 3, a longitudinal vertical section thereof, and Fig. 4 a detail view.

Similar letters of reference occurring on the several figures indicate corresponding parts.

Referring to the drawings, A represents the base or platform, having the balance rod or beam B pivoted in the central part thereof to a transverse bar or rod, B'. At each end of the balance rod or beam B, and projecting up through openings in the top of the platform A, is provided a circular or other suitably-shaped block, C, each of which is attached to and rests upon an upright rod, $c$, the lower end of said rod being notched to fit between the forked end of the scale-beam B, as shown. At the rear ends of each block C is secured the base of the upright arm $a$ of the bag-holders, which are bent over at the top, so as to provide two curved spring-arms, $b\ b'$, having sharp projecting points $e\ e'$, as shown.

D represents the hopper, which is arranged at a suitable distance above the platform A, and connected thereto by upright frames or supports A', the said hopper having a central sloping partition, $f$, for dividing the lower part into two conducting-chutes, $g\ g'$, which project in opposite directions to each other, as shown. Upon the top edge of this central partition, $f$, is provided a transverse rod, $h$, which is journaled in the front and rear walls of the hopper, and has attached to its central part a valve or cut-off, $i$, for directing the grain into either of the conducting-chutes $g\ g'$.

To the front end of the transverse rod $h$ is attached a small lug, $k$, which has pivoted to its outer end a pawl, $l$, which projects into the teeth of the ratchet $m$, which is journaled to the front wall of the hopper A, as shown in Fig. 1. Upon the under surface of the ratchet $m$ is provided a pin, $n$, which is adapted to catch into the teeth of the smaller ratchet, $o$, which is also journaled to the front wall of the hopper, and the said ratchets $m$ and $o$ being adapted to operate a suitable registering device upon the front of the hopper.

The rear end of the transverse rod $h$ is bent up at right angles to form an arm, E, upon which is adjusted the sliding weight F by means of the set-screw F'. The rear end of the bar B', to which the balance rod or beam B is attached, is also bent at right angles to form an arm, B², to the outer end of which is pivoted the lower end of the upright rod G, the upper end of which is also pivoted to the lower end of the cam H, as shown. Upon the inner upper end of the cam H are arranged two pins or projections, $s\ s$, between which rests the lower part of the arm E, carrying the weight F.

The construction of our invention being as described, it will be observed that in the operation of the same the empty grain-sacks are adjusted in position upon the bag-holders, with their bottoms resting upon the blocks C. The weight F is now adjusted at the proper position upon the arm E, according to the number of pounds of grain it is desired to run into each sack. The grain is now fed down through a suitable chute into the hopper D, from which it will run down into one of the sacks until it is filled sufficiently to overcome the resistance of the weight F and to depress or lower the block C upon the end of the balance rod or beam B, and throwing the weight F over to the opposite side through the medium of the rod G and cam H. As the weight F is thrown over it moves the transverse rod $h$, which operates the lug $k$, pawl $l$, and ratchet $m$, to indicate on the registering-dial that one bag has been filled, and at the same time the movement of the said rod $h$ throws the valve or cut-off $i$ over upon and closes the chute $g'$, through which the grain has just passed, and directs it into the opposite chute, $g$, to fill the other bag. The first or full bag is then removed and an empty one substituted in its place, so that it will be ready when the second or opposite bag is filled and has depressed the weight F and directed the grain again into the chute $g'$, in a manner already described.

By means of our improvements it is only necessary to allow the grain to be fed to the hopper and to remove the full bags one after another and substitute empty ones in their places, the grain being automatically weighed, bagged, and registered during the operation of the apparatus.

Having thus described our invention, what we claim as new and useful is—

1. The herein-described apparatus for automatically weighing, bagging, and registering grain, consisting of the platform A, provided with the balance rod or beam B, blocks C, and bag-holders, and the hopper D, connected to the platform A by uprights A', and provided with the valve $i$, registering devices $k$, $l$, $m$, and $o$, weight F, cam H, and rod G, all substantially as and for the purpose specified.

2. The hopper D, provided with chutes $g\ g'$, rod $h$, valve $i$, lug $k$, pawl $l$, and ratchets $m$ and $o$, arm E, carrying weight F, and cam H, in combination with rod G, arm $B^2$, balance rod or beam B, blocks C, and bag-holding devices, substantially as and for the purpose specified.

In testimony whereof we affix our signatures in presence of two witnesses.

CHARLES J. LEACH.
ALLEN OLDS.

Witnesses:
V. E. MANLEY,
W. BENNETT.